3,188,337
PREPARATION OF ORGANIC ISOCYANATES
Alois M. Gemassmer, Pittsburgh, Pa., assignor, by direct and mesne assignments, of one-half to Farbenfabriken Bayer Aktiengesellschaft, Leverkusen, Germany, a corporation of Germany and one-half to Mobay Chemical Company, Pittsburgh, Pa., a corporation of Delaware
No Drawing. Filed Oct. 6, 1958, Ser. No. 765,298
Claims priority, application Germany, Mar. 27, 1953,
F 11,460
22 Claims. (Cl. 260—453)

This is a continuation-in-part of application Serial No. 418,762, filed March 25, 1954, now abandoned.

This invention relates generally to the preparation of an organic isocyanate and more particularly to an improved method for making an organic isocyanate from an amine and phosgene.

It has been proposed heretofore to prepare an organic isocyanate by reacting phosgene and an amine. Ordinarily, this process is carried out in two steps, such as, for example, by the process disclosed by W. Siefkam, Liebigs Annalen der Chemie, volume 563 (1949), beginning on page 96. The first step of such a process is a primary or cold phosgenation step in which the amine while suspended or dissolved in an organic solvent is mixed with phosgene which may be added either as a gas or as a solution thereof in an inert organic solvent.

In an alternate procedure, the amine is converted into a carbon dioxide salt before it is reacted with phosgene. Otherwise, this process is similar to the direct phosgenation of the amine.

It is essential that the temperature throughout the primary phosgenation step be maintained at a point not above 60° C. in order to limit the amount of undesirable by-products such as disubstituted ureas and polyureas formed. In order to insure that this temperature will not be exceeded, it has been necessary to mix the amine and phosgene together at a relatively slow rate and to furnish external refrigeration. Because of the low temperature, chemical reaction is relatively slow so the primary phosgenation step requires as much as one hour or more. This necessarily requires that the process be a batch process. It has been found that care must be exercised in choosing the solvent in order to avoid a suspension or solution which is so viscous that mixing of the phosgene and amine is very difficult and time-consuming.

The reaction mixture from the primary phosgenation containing the carbamyl chloride is heated to a temperature of from about 100° C. to about 200° C. in a second or hot phosgenation step while introducing additional phosgene to convert the carbamyl chloride and amine hydrochloride into an isocyanate. Usually the yield of isocyanate is only from about 80 percent to about 90 percent of theoretical.

It is, therefore, an object of this invention to provide a method for making an organic isocyanate which is devoid of the disadvantages inherent in the primary phosgenation step of the heretofore available processes. Another object of the invention is to provide a method for making an organic isocyanate from an amine and phosgene without a prolonged primary phosgenation step and which avoids the necessity of refrigerating the reaction mixture. A further object of the invention is to provide a method for making an organic isocyanate which is adaptable for a greater throughput and greater yield per unit of time with equipment of a given size. Still other objects will become apparent from the following description.

As set forth in copending application, Serial Number 418,762, filed by me on March 25, 1954, of which this application is a continuation-in-part, the foregoing object and others are accomplished in accordance with this invention, generally speaking, by providing a process in which an amine, either in solution or suspension in an inert solvent, is contacted with phosgene in a high speed mixer. The phosgene may be liquid phosgene or a solution of phosgene in a suitable inert organic solvent therefor. It is not necessary to cool the reaction mixture because any temperature not substantially above 80° C. can be tolerated when a high speed mixer is used in the primary phosgenation step. Preferably, the high speed mixer is one which will effect substantially intimate mixing of the amine and phosgene in a short period of time of say from 3 or 4 seconds or not substantially more than about one minute.

In practicing the process of the invention, care must be taken to insure that the amount of phosgene present in the reaction mixture at all times is sufficient to react with the amine by properly adjusting the concentration and rate of addition of phosgene and amine solution. In order to insure this, it is preferable to use an excess of up to at least about 10 percent over the theoretical amount of phosgene required to react with the amine present in the reaction mixture. Seldom will more than about 250 percent excess phosgene be used. When mixing the phosgene and amine solution in accordance with the invention, a large amount of heat is evolved with an attendant rise in temperature of the reaction mixture. As pointed out hereinbefore, temperatures of above 60° C. were detrimental and had to be avoided for best results in the primary phosgenation step of prior processes. Very surprisingly, however, it has now been found that temperatures of above 60° C. do not adversely affect the yield when mixing is effected in a high speed mixer. Inasmuch as it is not necessary to cool the reaction mixture in the primary phosgenation step, the subsequent hot phosgenation step may be effected within a shorter period of time than has been possible heretofore.

Any suitable high speed mixer is contemplated by the invention, such as, for example, turbo mixers, colloid mills, pumps including centrifugal pumps, and the like, which contain structural elements which rotate at high speeds and thus insure intimate contact between the amine and phosgene within a relatively short period of time. Preferably, the high speed mixer should be one which rotates at a speed of about 1000 r.p.m. or more. In any event, intimate mixing must be achieved in not substantially more than one minute. Centrifugal pumps are preferred because they have the advantage that in addition to the mixing effect achieved, they also move the reaction mixture to the second or hot phosgenation step. The residence time in a high speed mixer must be relatively short and, generally, it is preferred that the reactants not remain in the mixer for substantially more than one minute.

In one embodiment of the process provided by this invention, a solution of phosgene and a solution of an amine are introduced through separate conduits into a high speed mixer. The reactants remain in this mixer for only a few seconds and are fed to a suitable vessel where the reaction mixture is heated to a temperature of about 100° C. or more and phosgene is added to convert the carbamyl chloride into an isocyanate. Depending upon the speed of the mixer, the reactants may be fed to the mixer continuously at any rate desired. Likewise, the rate of flow of reaction mixture into the apparatus wherein the hot phosgenation is conducted may be varied widely without adversely affecting the yield. The temperature of the reactor used for the hot phosgenation may be maintained at the desired reaction temperature from the very outset which makes it possible to carry out the hot phosgenation continuously.

In an alternate procedure, the reactor used for the hot phosgenation may be one adapted for batch-wise processing and may be filled with the reaction mixture leaving the mixing apparatus and then heated to effect conversion of the carbamyl chloride into an isocyanate.

Although the temperature in the hot phosgenation is preferably maintained between a temperature of about 100° C. to about 200° C. a higher temperature of up to 300° C. or more which is below the decomposition temperature of the isocyanate may be used. If the temperature is above the boiling point of the solvent, equipment suitable for operating under pressure must be provided.

The invention is most advantageous if the hot phosgenation is effected continuously since the time required for the hot phosgenation is very short in comparison with the time required in the heretofore available methods. Consequently, the throughput of product in a given sized apparatus can be much greater than the throughput with one of the heretofore available processes. The invention may be practiced in preparing any aromatic alicyclic and acyclic monoisocyanate or polyisocyanate from the corresponding amine. Examples of isocyanates which may be prepared include ethyl isocyanate, propyl isocyanate, cyclohexyl isocyanate, 2-naphthyl isocyanate, hexamethylene diisocyanate, toluylene diisocyanate, p-chlorophenyl isocyanate, dichlorohexamethylene diisocyanate, octadecyl isocyanate, 4,4'-diphenyl methane diisocyanate, and the like.

As indicated hereinbefore, the phosgene may be added to the liquid containing the amine either as liquid phosgene or as a solute in a suitable inert organic solvent. Any suitable organic solvent which is inert to the amine, the resulting isocyanate and phosgene may be used, such as, for example, ortho dichlorobenzene, ethyl acetate, xylene, toluene, or the like. Likewise, any suitable inert organic solvent including those just mentioned may be used for forming the solution or suspension of amine. The amount of amine and phosgene in the solution or suspension may be varied over a wide range without adversely affecting the yield to the extent the yield is effected by similar variation in heretofore known cold phosgenations. Preferably, the concentration of the amine in the solution or suspension is from about 25% to about 50% with from about 75% to about 50% of the mixture being inert organic solvent.

Example 1

From two separate vessels equal amounts of a 30 percent solution of phosgene in chlorobenzene and a 35 percent solution of alpha-naphthylamine in chlorobenzene are fed continuously via two rotameters to a turbo mixer (r.p.m. >1000). In the turbo mixer the solutions are intimately mixed, the temperature of the mixture rising to about 65° C. The reaction mixture, which has the consistency of a thin paste, is passed from the bottom to the top of two vertical tubes established one after the other. Simultaneously, phosgene is introduced into the tubes along with the reaction mixture from the cold phosgenation. The temperature in the tubes is maintained at 150° C. The residence time in the tubes amounts to 20 minutes. On blowing the dissolved phosgene with nitrogen a clear brownish solution results. By distilling off the solvent (chlorobenzene) a residue consisting of crude alpha-naphthyl-isocyanate contaminated with a small amount of high-boiling by-products is obtained. By distilling this product pure alpha-naphthyl-isocyanate is obtained in a yield of 98% based on naphthylamine. Only 2% of the product remain in the distillation residue. In contrast thereto, a yield of 78% of alpha-naphthylisocyanate and 22% of a high-boiling residue are obtained when in accordance with the conventional procedure a 35 percent naphthylamine solution is added to a 30 percent phosgene solution while cooling and stirring and the reaction mixture thus obtained is subjected to a hot phosgenation by introducing phosgene for 3 to 4 hours at a temperature of 150° C.

Example 2

Equal amounts of a solution of phosgene in ortho-dichlorobenzene (1 part of phosgene to 6 parts of ortho-dichlorobenzene) and of a solution of 4,4'-diamino-dicyclohexylmethane in ortho-dichlorobenzene (1 part of 4,4'-diamino-dicyclohexylmethane to 8 parts of ortho-dichlorobenzene) are continuously introduced via two separate conduits into a centrifugal pump (r.p.m. >1000). Owing to the heat of reaction the temperature in the centrifugal pump rises to about 60° C. The reaction mixture from the pump is fed to a vessel made of V4A-steel and equipped with a mixer. Here the mixture is maintained at a temperature of 150° C. for 3 hours while passing in phosgene (1 part of phosgene per 50 parts of product). Thus a clear solution is obtained. On removal of the excess phosgene by passing in nitrogen the solution is distilled whereby a yield of 95% of dicyclohexylmethane-4,4'-diisocyanate boiling at 179° C./0.9 millimeters is obtained. The distillation residue amounts only to 4%.

In contrast hereto, 80% of diisocyanate and 18% of high-boiling distillation residue are obtained if the diamine solution is slowly added to the phosgene solution while stirring in accordance with the conventional method.

Example 3

Per unit of time solutions of 26.9 parts of octadecylamine in 70 parts of chlorobenzene and of 12 parts of phosgene in 70 parts of chlorobenzene are continuously fed via separate conduits to the suction side of a centrifugal pump (r.p.m. >1000). In the centrifugal pump the solutions are mixed and a reaction takes place whereby the temperature is raised to about 70° C. The mixture leaving the pump is driven into a reactor in which the reaction is finished at a temperature of 110 to 120° C. while introducing gaseous phosgene. A clear brownish solution is obtained. After distilling off the chlorobenzene the octadecylisocyanate contained in the reaction mixture is distilled at 150 to 170° C./3 millimeters. The yield of octadecylisocyanate amounts to 96% based on octadecylamine while 4% remain in the distillation residue.

Example 4

Per unit of time 17 parts of a 50 percent solution para-phenetidine in chlorobenzene and 25 parts of a 40 percent solution of phosgene in chlorobenzene are continuously introduced via separate conduits into the suction branch of a centrifugal pump (r.p.m. >1000). In the centrifugal pump the solutions are mixed. Owing to the heat evolved in the reaction the temperature rises to about 80° C. in the pump. The reaction mixture leaving the pump is fed to a reactor where it is treated with phosgene at 100° C. After a short while a clear solution results. On removal of the dissolved phosgene by blowing with dry nitrogen the para-ethoxyphenylisocyanate is recovered by distillation. The isocyanate boils at 142° C./50 millimeters and is a clear colorless liquid. The yield amounts to 97% based on para-phenetidine while 3% are obtained as high-boiling by-products.

Example 5

A fine suspension of 30 parts of 4-4'-diaminodiphenylmethane in 70 parts of ortho-dichlorobenzene is intimately mixed with the equal volume of a 30 percent solution of phosgene in ortho-dichlorobenzene in a colloid mill (r.p.m. >1000). The reaction mixture is continuously fed to a tube in which it is treated with phosgene at 130° C. The residence time of the mixture in the tube is 4 hours. After removing the excess phosgene and distilling off the solvent the diphenylmethane-4,4'-diisocyanate is fractionated. B.P. 170° C./1 millimeter. Yield: 90% of the theoretical.

Example 6

A 20 percent solution of diaminocyclohexane in chlorobenzene is mixed with the equal volume of a 40 percent solution of phosgene in chlorobenzene in a colloid mill (r.p.m. >1000). The reaction mixture thus obtained is introduced into a reactor along with phosgene, the temperature in the reactor being maintained at 120° C. until a clear solution results. By distillation cyclohexane-1,4-diisocyanate is obtained in a yield of 85%.

Example 7

Following the procedure of Example 6, equal volumes of a 22 percent solution of cyclohexylamine and of a 22 percent solution of phosgene in chlorobenzene are mixed in a colloid mill (r.p.m. >1000) and the reaction product is then contacted with phosgene for ½ hour at 110° C. The yield of cyclohexylisocyanate amounts to at least 90% based on cyclohexylamine.

Example 8

A fine suspension of 20 parts of "tolamin" (mixture of 70 to 80% of 1-methyl-2,4-diamino-benzene with 20 to 30% of 1-methyl-2,6-diamino-benzene) in 100 parts of ortho-dichlorobenzene is intimately mixed with an equal volume of a 50 percent solution of phosgene in 100 parts of ortho-dichlorobenzene in a centrifugal pump (r.p.m. >1000). The reaction mixture is heated to 140° C. while introducing phosgene until a clear solution results. Thus, diisocyanato-toluene is obtained in a yield of 85% based on tolamin.

Example 9

A solution of 2,4 toluylene diamine in ortho-dichlorobenzene having a concentration of about 15 pounds amine to about 285 pounds solvent is pumped through a centrifugal pump at the rate of about 300 pounds solution per minute and liquid phosgene at a temperature of about 0° C. is added simultaneously to the pump at the rate of about 61 pounds per minute. The temperature of the toluylene solution is about 75° C. as it enters the pump. The reaction mixture from the pump flows continuously into a vessel having a stirrer where the reaction mixture is heated to a temperature of about 150° C. for about 3 hours while adding phosgene. Excess phosgene is removed by passing nitrogen into the solution and distilling. The yield of 2,4 toluylene diisocyanate is from about 96 percent to about 98 percent of theoretical.

Example 10

A solution containing para-chlorophenyl amine dissolved in ortho-dichlorobenzene in a ratio of about 15 pounds para-chlorophenyl amine per 285 pounds ortho-dichlorobenzene is pumped through a centrifugal pump at a rate of about 300 pounds per minute. Phosgene is added to the pump simultaneously at the rate of about 61 pounds per minute. The phosgene has been cooled to about 0° C. to liquify it before it is added to the pump. The temperature of the amine solution is about 75° C. The reactants remain in the pump for less than one minute and are pumped to a vessel where the temperature is raised to about 150° C. and held at this point for about three hours. Excess phosgene is removed from the solution by heating and passing nitrogen through it. The product contains from about 98 percent to about 99 percent para-chlorophenyl isocyanate.

Example 11

A solution containing para-chlorophenyl amine dissolved in ethyl acetate in a ratio of about 15 pounds para-chlorophenyl amine per 285 pounds ethyl acetate is pumped through a centrifugal pump at a rate of about 300 pounds per minute. Phosgene dissolved in ethyl acetate is added to the pump simultaneously at the rate of about 61 pounds phosgene per minute. The solution contains about 30 percent by weight phosgene. The temperature of the amine solution is about 75° C. The reactants remain in the pump for less than one minute and are pumped to a vessel where the temperature is raised to about 150° C. and held at this point for about three hours. Excess phosgene is removed from the solution by bubbling nitrogen through it. The product contains from about 97 percent to about 98 percent para-chlorophenyl isocyanate.

Example 12

A solution containing para-chlorophenyl amine dissolved in xylene in a ratio of about 15 pounds para-chlorophenyl amine per 285 pounds xylene is pumped through a centrifugal pump at a rate of about 300 pounds per minute. Phosgene is added to the pump simultaneously at the rate of about 61 pounds per minute. The phosgene has been cooled to about 0° C. to liquify it before it is added to the pump. The temperature of the amine solution is about 75° C. The reactants remain in the pump for less than one minute and are pumped to a vessel where the temperature is raised to about 150° C. and held at this point for about three hours. Excess phosgene is removed from the solution by distillation and the product contains about 97 percent para-chlorophenyl isocyanate.

Example 13

A solution containing diphenyl methane-4,4'-diamine in ortho-dichlorobenzene in a ratio of about 15 pounds diphenyl methane-4,4'-diamine per 285 pounds ortho-dichlorobenzene is pumped through a centrifugal pump at a rate of about 300 pounds per minute. A 30 percent solution of phosgene in ortho-dichlorobenzene is added to the pump simultaneously at the rate of about 61 pounds phosgene per minute. The temperature of the diamine solution is about 75° C. The reactants remain in the pump for less than one minute and are pumped to a vessel where the temperature is raised to about 150° C. and held at this point for about three hours. Excess phosgene is removed from the solution by distillation and the product contains from about 93 percent to about 94 percent diphenyl methane-4,4'-diisocyanate.

Example 14

A solution of 2,4-toluylene diamine in monochlorobenzene at a temperature of about 75° C. and having a concentration of about 112 grams amine to about 1580 grams solvent is pumped through a centrifugal pump at the rate of about 260 grams solution per minute and a solution of phosgene in monochlorobenzene at ambient temperature having a concentration of about 435 grams phosgene in about 1230 grams of monochlorobenzene is added simultaneously to the pump at the rate of about 255 grams per minute of solution. The reaction mixture from the pump flows continuously into a vessel having a stirrer where the reaction mixture is heated to a temperature of about 120° C. and held for about three hours while adding additional phosgene to maintain a good reflux. Excess phosgene is then removed by passing nitrogen through the solution. The crude isocyanate is then distilled. The yield of 2,4-toluylene diisocyanate is from about 96% to about 98% of theoretical.

Example 15

A solution of "tolamin" (a mixture of about 80% of 2,4-toluylene diamine and about 20% of 2,6-toluylene diamine) in ortho-dichlorobenzene having a concentration of about 120 grams of amine to about 1860 grams solvent is pumped through a running centrifugal pump at the rate of about 280 grams of solution per minute. A solution of phosgene in ortho-dichlorobenzene at ambient temperature and having a concentration of about 525 grams of phosgene in about 920 grams of solvent is added simultaneously to the pump at the rate of about 200 grams per minute of solution. The amine solution is maintained at 65° C. The reaction mixture from the pump is collected in a vessel having a stirrer where the reaction mixture is heated to a temperature of about 150° C. and held for three hours while adding additional phosgene to maintain a good reflux. The excess phosgene is then removed by passing nitrogen through the solution. The solvent and isocyanate are fractionally distilled and a yield of about 97% of theory is obtained.

*Example 16*

A solution of 2,4-toluylene diamine in ethyl acetate at a temperature of about 30° C. and having a concentration of about 200 grams of amine in about 1400 grams of ethylacetate is fed to a centrifugal pump at a rate of about 230 grams of solution per minute. A phosgene solution at ambient temperature having a concentration of about 900 grams of phosgene in about 1260 grams of ethylacetate is added simultaneously to the pump at a rate of about 305 grams per minute of solution. The reaction mixture from the pump flows continuously into a vessel having a stirrer where the mixture is heated to a temperature of about 80° C. and held for about three hours while adding additional phosgene to maintain a good reflux. Excess phosgene is then removed by passing nitrogen or similar inert gas into the solution and the crude isocyanate is then distilled. The yield of 2,4-toluylene diisocyanate is from about 97 percent to about 98 percent of theoretical.

*Example 17*

A solution of 2,4-toluylene diamine in chlorobiphenyl at a temperature of about 75° C. and having a concentration of about 110 grams amine to about 2080 grams of chlorobiphenyl solvent and 100 grams o-dichlorobenzene is pumped through a running centrifugal pump at the rate of about 290 grams per minute of solution. A solution of phosgene in chlorobiphenyl at 25° C. having a concentration of about 360 grams of phosgene in about 3250 grams of chlorobiphenyl is added simultaneously to the pump at the rate of about 445 grams of solution per minute. The reaction mixture from the pump flows continuously into an agitated vessel where the mixture is heated to from about 180° C. to about 200° C. and held for about 3 hours while phosgene is added at a rate of about 220 grams per hour. Dissolved phosgene is then removed by passing nitrogen into the solution. The isocyanate is distilled off of the chlorobiphenyl in yields of about 85% to about 98% of theoretical.

*Example 18*

A fine suspension of about 20 parts of 2,4-toluylene diamine in about 80 parts of a gasoline fraction (B.P. 150–160° C.) at a temperature of about 25° C. is intimately mixed with twice the volume of about a 25% solution of phosgene in about 200 parts of the gasoline fraction in a centrifugal pump (r.p.m.>1000). The reaction mixture is heated to about 150° C. while introducing phosgene solution until the solution is clear of solids. Thus, toluylene diisocyanate is obtained in a yield of about 85%.

*Example 19*

A solution of "tolamin" (mixture of about 80% of 2,4-toluylene diamine and about 20% of 2,6-toluylene diamine) in ortho-dichlorobenzene at a temperature of about 85° C. and having a concentration of about 300 grams amine to about 600 grams solvent is pumped through a running centrifugal pump at a rate of about 100 grams of solution per minute. A solution of phosgene in ortho-dichlorobenzene at about 0° C. temperature and having a concentration of about 1100 grams of phosgene per 900 grams solvent is added simultaneously to the pump at the rate of about 220 grams per minute of solution. The reaction mixture from the pump is collected in a vessel having a stirrer where the reaction mixture is heated to a temperature of about 155° C. and held for about 3 hours while adding additional phosgene to maintain reflux to the vessel. The excess phosgene is then removed by passing nitrogen through the solution. The solvent and isocyanate are fractionally distilled and a yield of about 95% to about 97% of theoretical is obtained.

It is to be understood that other amines dissolved as suitable herein may be substituted in the foregoing examples for the particular amines used and that the corresponding isocyanate will be obtained.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. In the process for the production of an organic isocyanate selected from the group consisting of aromatic, alicyclic and acylic isocyanates in which an amine is reacted with phosgene in a primary phosgenation step to form a carbamyl chloride and in which the reaction mixture from the primary phosgenation step is heated to a temperature of at least about 100° C. in a second phosgenation step to form an isocyanate, the improvement for the primary phosgenation which comprises continuously pumping a liquid containing phosgene and amine in an inert solvent together through a high speed mixer at a temperature not substantially above about 80° C. to the second phosgenation step at a flow rate sufficient to maintain the residence time of the reactants in the primary phosgenation step below about one minute.

2. Improvement according to claim 1 in which the reactants are pumped through a high speed mixer without cooling with the primary phosgenation being effected at a temperature of up to about 80° C.

3. The process of claim 1 wherein the second phosgenation is conducted at a temperature of from about 100° C. and about 200° C.

4. Improvement according to claim 1 in which said high speed mixer is operated at a speed in excess of about 1000 r.p.m.

5. Improvement according to claim 4 in which said high speed mixer is a centrifugal pump.

6. In the preparation of an organic isocyanate selected from the group consisting of aromatic, alicyclic, and acylic isocyanates, the improvement which comprises mixing an amine in an inert solvent and a liquid containing phosgene in a high speed mixer, said mixing being effected within not substantially more than about one minute and thereafter heating the resulting reaction mixture to a temperature of at least about 100° C. to form an isocyanate.

7. The process of claim 6 wherein the phosgene is liquid phosgene.

8. The process of claim 6 wherein the phosgene is dissolved in an inert organic solvent therefor.

9. The process of claim 6 wherein the said mixing is achieved at a temperature above about 60° C.

10. The process of claim 6 wherein the amine is tolylene diamine.

11. In the preparation of an organic isocyanate selected from the group consisting of aromatic, alicyclic, and acylic isocyanates, the improvement which comprises mixing liquids which consist of an amine in an inert solvent and phosgene dissolved in an inert solvent in a high speed mixer, said mixing being effected within not substantially more than about one minute and thereafter heating the resulting reaction mixture to a temperature of at least about 100° C. to form an isocyanate.

12. In a method of preparing aromatic isocyanates by reacting, in an inert organic solvent, a stoichiometric excess of phosgene with a compound selected from the group consisting of aromatic primary mono-, di-, and polyamines having no substituents other than primary amino which are capable of reacting with phosgene under the conditions employed, to form the corresponding isocyanate, the improvement which comprises carrying out the initial phosgenation at a temperature within the range of 60° C. to 80° C. in a high-speed mixer to produce an intermediate product which contains an admixture of the desired isocyanate and the corresponding intermediate carbamyl chloride, and reacting said intermediate product in the presence of phosgene at a higher temperature to produce an aromatic isocyanate.

13. A method according to claim 12 in which the aromatic primary amine is a diamine.

14. A process according to claim 12 in which the aromatic primary amine is 2,4-tolylene diamine.

15. A process according to claim 12 in which the aromatic primary amine is a mixture of 2,4- and 2,6-tolylene diamines.

16. In a method for continuously preparing aromatic isocyanates by reacting phosgene in an inert organic solvent with a compound selected from the group consisting of aromatic primary mono-, di-, and polyamines having no substituents other than primary amino which are capable of reacting with phosgene under the conditions employed, to form the corresponding isocyanate, the improvement which comprises: continuously supplying into a high-speed mixer said inert organic solvent, said amine and phosgene, more phosgene being introduced than is stoichiometrically the equivalent of the amine being introduced; maintaining a temperature in the range from 60° C. to 80° C. in said high-speed mixer; continuously withdrawing liquid from the said mixer to a secondary reaction zone; maintaining the temperature of said secondary reaction zone above the temperature of said high-speed mixer, and continuously withdrawing from said secondary reaction zone a solution of isocyanate product.

17. A process in accordance with claim 16 in which the aromatic primary amine is a diamine.

18. A process according to claim 16 in which the aromatic primary amine is 2,4-tolylene diamine.

19. A process according to claim 16 in which the aromatic primary amine is a mixture of 2,4-tolylene diamine and 2,6-tolylene diamine.

20. In a method for preparing 2,4-tolylene diisocyanate by reacting 2,4-tolylene diamine and a stoichiometric excess of phosgene in chlorobenzene solution to form the diisocyanate, the improvement which comprises carrying out the initial phosgenation at a temperature of about 80° C. in a high-speed mixer to produce an intermediate product, which contains an admixture of the desired isocyanate and the corresponding intermediate carbamyl chloride, and reacting said intermediate product in the presence of phosgene at a temperature of about 110° C. to 120° C. to produce 2,4-tolylene diisocyanate.

21. A continuous process for the manufacture of 2,4-tolylene diisocyanate which comprises: continuously supplying phosgene and a chlorobenzene solution of 2,4-tolylene diamine containing from 7 to 8 percent diamine into a high-speed mixer, said phosgene and said diamine being supplied in a molar ratio of greater than 2; maintaining the temperature in said high-speed mixer at about 80° C.; continuously withdrawing liquid from said high-speed mixer to a secondary reaction zone; maintaining the temperature of said secondary reaction zone at about 110° C. to 120° C.; and continuously withdrawing a chlorobenzene solution of 2,4-tolylene diisocyanate from said secondary reaction zone.

22. A process of preparing a mixture of 2,4- and 2,6-tolylene diisocyanates which comprises: continuously supplying phosgene and a chlorobenzene solution of a mixture of 2,4- and 2,6-tolylene diamines containing 10 percent diamines into a high-speed mixer, said phosgene and said diamine mixture being supplied in a molar ratio greater than 2; maintaining the temperature in said high-speed mixer at about 80° C.; continuously withdrawing liquid from said high-speed mixer to a secondary reaction zone; continuously supplying phosgene to said secondary reaction zone; maintaining the temperature of said secondary reaction zone at about 110° C. to 120° C.; and withdrawing from said secondary reaction zone a chlorobenzene solution of mixed 2,4- and 2,6-tolylene diisocyanates.

References Cited by the Examiner

UNITED STATES PATENTS

| | | | |
|---|---|---|---|
| 1,232,249 | 7/17 | Dugan | 23—286 X |
| 2,174,954 | 10/39 | Vesce | 260—197 |
| 2,480,089 | 8/49 | Slocombe et al. | 260—453 |
| 2,666,788 | 1/54 | Ebel | 260—457 X |
| 2,680,129 | 6/54 | Flores | 260—453 |
| 2,683,160 | 7/54 | Irwin | 260—453 |
| 2,733,254 | 1/56 | Allen et al. | 260—453 |
| 2,822,373 | 2/58 | Beck | 260—453 |
| 2,908,703 | 10/59 | Latourette et al. | 260—453 |

FOREIGN PATENTS

| | | |
|---|---|---|
| 118,894 | 9/44 | Australia. |
| 462,182 | 3/37 | Great Britain. |
| 567,752 | 3/45 | Great Britain. |

CHARLES B. PARKER, *Primary Examiner.*

L. ZITVER, *Examiner.*